(12) United States Patent
Kanbayashi et al.

(10) Patent No.: US 11,338,814 B2
(45) Date of Patent: May 24, 2022

(54) ROAD SURFACE CONDITION ASSESSING DEVICE

(71) Applicant: DENSO CORPORATION, Kariya (JP)

(72) Inventors: Ryosuke Kanbayashi, Kariya (JP); Nobuya Watabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 164 days.

(21) Appl. No.: 16/910,412

(22) Filed: Jun. 24, 2020

(65) Prior Publication Data

US 2020/0317204 A1    Oct. 8, 2020

Related U.S. Application Data

(63) Continuation of application No. PCT/JP2018/047409, filed on Dec. 24, 2018.

(30) Foreign Application Priority Data

Dec. 27, 2017  (JP) .............................. JP2017-252017
Jun. 22, 2018  (JP) .............................. JP2018-118774

(51) Int. Cl.
  *B60W 40/06*    (2012.01)
  *G01H 11/08*   (2006.01)
  *G01P 15/00*   (2006.01)
  *B60C 19/00*   (2006.01)

(52) U.S. Cl.
  CPC ............ *B60W 40/06* (2013.01); *B60C 19/00* (2013.01); *G01H 11/08* (2013.01); *G01P 15/00* (2013.01); *B60C 2019/004* (2013.01); *B60W 2420/10* (2013.01); *B60W 2555/20* (2020.02)

(58) Field of Classification Search
  None
  See application file for complete search history.

(56) References Cited

U.S. PATENT DOCUMENTS 10,377,385 B2 *  8/2019  Hanatsuka ............ B60W 40/06
10,661,617 B2 *  5/2020  Sekizawa .............. B60W 40/06
10,726,714 B2 *  7/2020  Sekizawa ................ B60C 23/04
(Continued)

FOREIGN PATENT DOCUMENTS

JP      2007055284 A     3/2007
JP      2015214192 A    12/2015
(Continued)

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

A road surface condition assessing device includes: a tire-mounted device; and a vehicle body system. The tire-mounted device includes: a vibration detector that outputs a detection signal of a vibration on a tire; a waveform processor that generates the road surface data; and a first data communication unit. The vehicle body system includes: a second data communication unit; and a road surface evaluation unit that evaluates the road surface condition. The tire-mounted device transmits an advertise signal including the road surface data indicative of a result of a waveform process on the detection signal and a waveform processing value corresponding to the road surface condition. The vehicle body system evaluates the road surface condition based on the waveform processing value.

6 Claims, 7 Drawing Sheets

(56) References Cited

U.S. PATENT DOCUMENTS

| | | | | |
|---|---|---|---|---|
| 11,065,921 B2* | 7/2021 | Saito | .................... | H01Q 1/2241 |
| 2018/0264894 A1* | 9/2018 | Goto | ....................... | B60T 8/172 |
| 2019/0185008 A1* | 6/2019 | Kanbayashi | ............ | B60C 23/00 |
| 2020/0208969 A1* | 7/2020 | Suzuki | .................... | B60C 19/00 |

FOREIGN PATENT DOCUMENTS

| | | | |
|---|---|---|---|
| JP | 2016107833 A | 6/2016 | |
| JP | 2018184101 A | 11/2018 | |

* cited by examiner

ROAD SURFACE CONDITION ASSESSING DEVICE

CROSS REFERENCE TO RELATED APPLICATION

The present application is a continuation application of International Patent Application No. PCT/JP2018/047409 filed on Dec. 24, 2018, which designated the U.S. and claims the benefit of priority from Japanese Patent Applications No. 2017-252017 filed on Dec. 27, 2017 and No. 2018-118774 filed on Jun. 22, 2018. The entire disclosures of all of the above applications are incorporated herein by reference.

TECHNICAL FIELD

The present disclosure relates to relates to a road surface condition assessing device

BACKGROUND

According to a conceivable technique, a road surface condition evaluation method is configured to provide an acceleration sensor for the rear surface of a tire tread, allow the acceleration sensor to detect a vibration applied to the tire, and evaluate a road surface condition based on a vibration detection result. This road surface condition evaluation method evaluates the road surface condition by extracting a feature vector from the tire vibration waveform detected by the acceleration sensor and calculating similarity ratios between the extracted feature vector and all support vectors stored correspondingly to the road surface types. For example, a kernel function is used to calculate similarity ratios between the extracted feature vector and all support vectors and evaluate the road surface type indicating the highest similarity ratio as a road surface condition in which the vehicle is currently traveling. For example, the road types include dry road surface, wet road surface, frozen road, and snowy road. This road surface condition evaluation method can highly robustly evaluate road surfaces.

SUMMARY

According to an example embodiment, a road surface condition assessing device includes: a tire-mounted device; and a vehicle body system. The tire-mounted device includes: a vibration detector that outputs a detection signal of a vibration on a tire; a waveform processor that generates the road surface data; and a first data communication unit. The vehicle body system includes: a second data communication unit; and a road surface evaluation unit that evaluates the road surface condition. The tire-mounted device transmits an advertise signal including the road surface data indicative of a result of a waveform process on the detection signal and a waveform processing value corresponding to the road surface condition. The vehicle body system evaluates the road surface condition based on the waveform processing value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following embodiments relate to a road surface condition assessing device that allows a tire-mounted device to detect a vibration applied to the tire, generates road surface data representing a road surface condition based on vibration data, transmits the road surface data to a vehicle body system, and evaluates a road surface condition based on the road surface data.

The inventors examined the bidirectional communication capable of reliable communication between the tire-mounted device including an acceleration sensor and a receiver on the vehicle body in the road surface condition assessing device.

To perform bidirectional communication in the communications field, a communication connection is established to form a dedicated connection path between both parties. Practical data communication is performed after the connection is established. To establish the connection, one device transmits an advertise signal. The other device receives the advertise signal and then transmits a connection request signal to the one device. The establishment of the connection enables communication of a large amount of data.

However, the road surface condition assessing device uses the tire-mounted device included in a tire and makes it difficult to replace a battery. The sensing or data communication needs to use limited electric power. As above, it is possible to reliably communicate a large amount of data by establishing the connection based on the advertise signal and then transmitting data. However, the power consumption increases. In consideration of the battery life of the tire-mounted device, it is unfavorable to increase the power consumption when the connection remains established or the connection is established to transmit data each time the data is transmitted.

Thus, a road surface condition assessing device is provided to be capable of reducing the power consumption and appropriately evaluating road surface conditions.

The road surface condition assessing device according to an example embodiment includes a tire-mounted device that is provided for a tire and transmits road surface data concerning a road surface condition; and a vehicle body system that is provided for a vehicle body and receives the road surface data to evaluate the road surface condition. The tire-mounted device and the vehicle body system performs bidirectional communication. In this configuration, the tire-mounted device includes a vibration detection portion that outputs a detection signal corresponding to the magnitude of a vibration applied to the tire; a waveform processing portion that generates the road surface data based on the detection signal; and a first data communication portion that performs data communication with the vehicle body system. The vehicle body system includes a second data communication portion that performs data communication with the tire-mounted device; and a road surface evaluation portion that evaluates a road surface condition based on the road surface data received by the second data communication portion. The tire-mounted device transmits the road surface data contained in an advertise signal. The road surface data indicates a result of waveform processing performed by the waveform processing portion on the detection signal and contains a waveform processing value corresponding to the road surface condition. The vehicle body system evaluates the road surface condition based on the waveform processing value contained in the advertise signal.

In the road surface condition assessing device, the tire-mounted device transmits the road surface data by allowing an advertise signal to include the road surface data containing the feature quantity as small-quantity data and evaluates the road surface based on the feature quantity. This makes it possible to perform the road surface evaluation without establishing a connection and reduce the power consumption without needing to establish a connection each time the road surface data is transmitted. The road surface condition assessing device can appropriately evaluate road surface conditions while reducing power consumption.

A parenthesized reference numeral assigned to each constituent element exemplarily represents the correspondence relationship between the constituent element and a specific constituent element described in an embodiment to be described later, for example.

Embodiments of the present disclosure will be described with reference to the accompanying drawings. Hereinafter, the mutually equal or comparable parts in the embodiments are designated by the same reference numerals.

First Embodiment

With reference to FIGS. 1 through 8, the description below explains a tire device 100 having a road surface condition evaluation function according to the present embodiment. The tire device 100 according to the present embodiment evaluates a road surface condition during the travel based on vibrations applied to contact areas of tires provided for wheels of a vehicle and notifies a vehicle risk or provides vehicle motion control based on the road surface condition.

Figure 1:
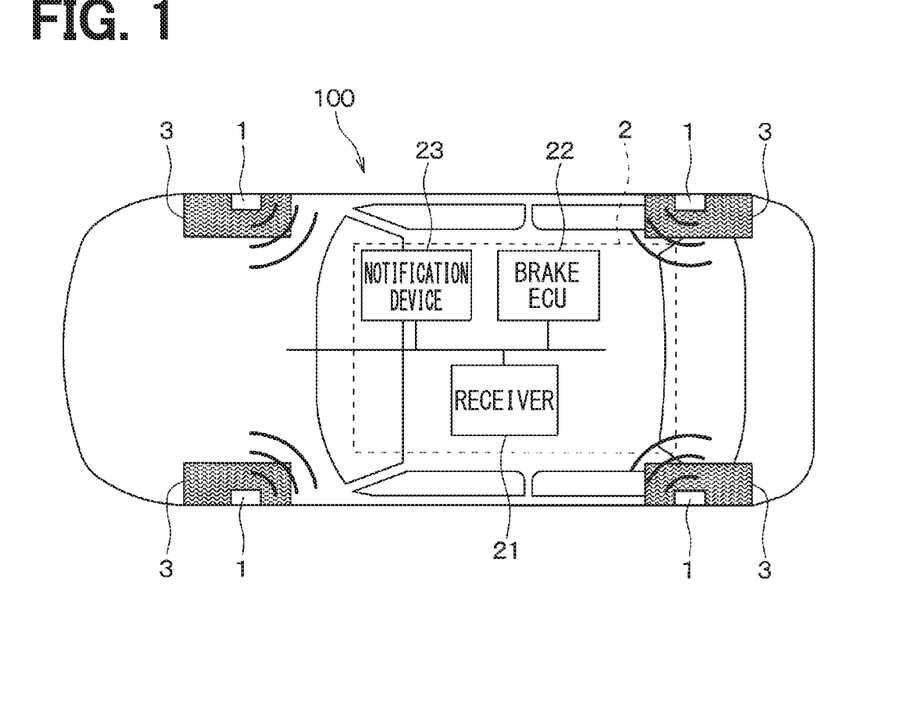
FIG. 1 is a diagram illustrating a block configuration of a tire device that includes a tire-mounted device and a vehicle body system according to a first embodiment and is mounted on a vehicle.
Figure 2:
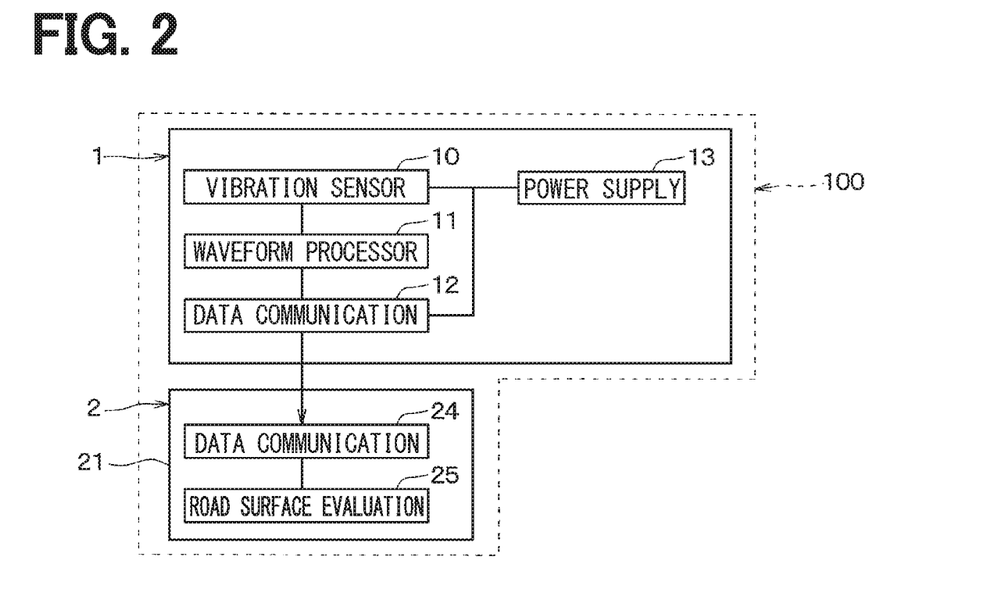
FIG. 2 is a block diagram illustrating the tire-mounted device and a receiver of the vehicle body system in details.

As illustrated in FIGS. 1 and 2, the tire device 100 includes a tire-mounted device 1 provided for a wheel and a vehicle body system 2 including components provided for a vehicle body. The vehicle body system 2 includes a receiver 21, a brake ECU 22 (an electronic control unit for brake control), and a notification device 23. Part of the tire device 100 to implement the road surface condition evaluation function is comparable to the road surface condition assessing device. According to the present embodiment, the tire-mounted device 1 and the receiver 21 of the vehicle body system 2 configure the road surface condition assessing device.

In the tire device 100 according to the present embodiment, the tire-mounted device 1 transmits road surface data, namely, data corresponding to a road surface condition during the travel of a tire 3. The receiver 21 receives the road surface data to evaluate the road surface condition. The tire device 100 transmits a result of evaluating the road surface condition from the receiver 21 to the notification device 23 and allows the notification device 23 to notify the result of evaluating the road surface condition. A driver can be notified of the road surface condition such as dry road, wet road, or frozen road. It is possible to warn the driver against a slippery road surface. The tire device 100 transmits the road surface condition to the brake ECU 22 providing the vehicle motion control and thereby provides the vehicle motion control to avoid a hazard. For example, a frozen road, compared to a dry road, decreases a braking force generated correspondingly to the amount of brake operation, thus providing the vehicle motion control corresponding to a low coefficient of friction on a road. The tire-mounted device 1 and the receiver 21 are specifically configured as follows.

Figure 3:
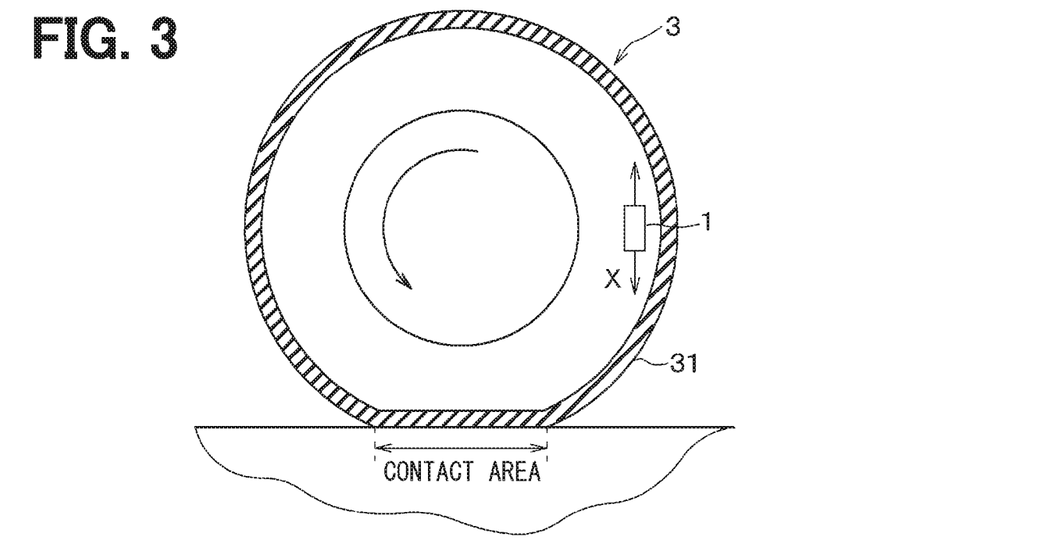
FIG. 3 is a sectional view of a tire mounted with the tire-mounted device.

As illustrated in FIG. 2, the tire-mounted device 1 includes a vibration sensor portion 10, a waveform processing portion 11, a data communication portion 12, and a power supply portion 13. As illustrated in FIG. 3, the tire-mounted device 1 is provided for the reverse side of a tread 31 of the tire 3.

The vibration sensor portion 10 configures a vibration detection portion to detect vibrations applied to the tire 3. For example, the vibration sensor portion 10 is configured as an acceleration sensor. In this case, the vibration sensor portion 10 outputs an acceleration detection signal as a detection signal corresponding to the vibration amplitude in the direction corresponding to arrow X in FIG. 3 as a tangential direction of the tire, the direction being tangential to a circular orbit formed by the tire-mounted device 1 when the tire 3 rotates, for example. More specifically, the vibration sensor portion 10 generates a detection signal by using an output voltage, for example, that is positive in one of directions indicated by arrow X and is negative in the other direction. For example, the vibration sensor portion 10 detects an acceleration at a predetermined sampling cycle shorter than one rotation of the tire 3 and outputs the acceleration as a detection signal. The detection signal from the vibration sensor portion 10 is represented as an output voltage or an output current. The example below uses output voltages.

The waveform processing portion 11 is configured as a known microcomputer including a CPU, ROM, RAM, and I/O, for example. The waveform processing portion 11 processes a detection signal based on a program mainly stored in the ROM and generates road surface data representing a road surface condition appearing in the detection signal. The road surface data is categorized into data containing the feature quantity of tire vibrations and data containing the feature quantity and a raw waveform of the detection signal.

Specifically, the waveform processing portion 11 uses a detection signal output from the vibration sensor portion 10 as a detection signal representing vibration data in the tangential direction of the tire and processes a vibration waveform indicated by the detection signal to extract the feature quantity of the tire vibration. The present embodiment processes the detection signal representing an acceleration (tire G) of the tire 3 to extract the feature quantity of tire G. The waveform processing portion 11 acquires a raw waveform for the detection signal from the vibration sensor portion 10, performs a signal process such as noise removal as needed, and converts the raw waveform into data (raw waveform data). The waveform processing portion 11 transmits data containing the extracted feature quantity or the raw waveform data as road surface data to the data communication portion 12. The present embodiment allows the road surface data containing the raw waveform data to contain data representing the feature quantity but may not contain the data representing the feature quantity. The feature quantity will be described in detail later.

The waveform processing portion 11 controls data transmission from the data communication portion 12. The waveform processing portion 11 enables data communication from the data communication portion 12 by transmitting the road surface data to the data communication portion 12 at the timing to activate the data transmission. For example, the waveform processing portion 11 extracts the feature quantity of tire G each time the tire rotates once. The waveform processing portion 11 transmits the road surface data to the data communication portion 12 once or more each time the tire 3 makes one or more rotations. For example, suppose the road surface data contains the feature quantity of tire G extracted during one rotation of the tire 3. The waveform processing portion 11 transmits this road surface data to the data communication portion 12. The waveform processing portion 11 may receive a detailed data request signal from the vehicle body system 2. In this case, the waveform processing portion 11 transmits the road surface data to the data communication portion 12 by supplementing the road surface data with the raw waveform data as well as the feature quantity of tire G extracted during one rotation of the tire 3 at that time.

The data communication portion 12 configures a first data communication portion and performs data communication with a data communication portion 24 of the receiver 21 in the vehicle body system 2 as will be described later. For example, the data communication portion 12 transmits the road surface data at the timing the road surface data is transmitted from the waveform processing portion 11. The waveform processing portion 11 controls the timing to transmit data from the data communication portion 12. The data communication portion 12 transmits data each time the waveform processing portion 11 transmits the road surface data in response to one or more rotations of the tire 3.

The data communication portion 12 is capable of bidirectional communication with the data communication portion 24. The data communication portion 12 is described as a single configuration here but may be separately configured as a transmission portion and a reception portion. The bidirectional communication is available in various implementations such as Bluetooth communication including BLE (Bluetooth Low Energy) communication, wireless LAN (Local Area Network) such as wifi, Sub-GHz communication, ultra wideband communication, and ZigBee. Bluetooth is a registered trademark.

As above, to perform bidirectional communication in the communications field, a communication connection is established to form a dedicated connection path between both parties. Practical data communication is performed after the connection is established.

However, the present embodiment uses different bidirectional communication techniques depending on whether the tire-mounted device 1 transmits a large quantity of data or a small quantity of data to the vehicle body system 2. Specifically, a relatively small quantity of data is denoted as "small-quantity data" representing "road surface data containing the feature quantity" that does not contain the raw waveform data. Data indicated by the quantity larger than the small-quantity data is denoted as "large-quantity data" representing "road surface data containing the raw waveform data" regardless of whether the feature quantity is contained. The present embodiment changes bidirectional communication forms depending on "road surface data containing the feature quantity" as "small-quantity data" and "road surface data containing the raw waveform data besides the feature quantity" as "large-quantity data." Namely, the former is capable of data communication without establishing the connection and the latter is capable of data communication after establishing the connection.

To establish a connection, the tire-mounted device 1 transmits an advertise signal. The vehicle body system 2 receives the advertise signal and transmits a connection request signal to the tire-mounted device 1. The establishment of the connection also enables communication of large-quantity data. This is because one-time transmission is inadequate to transmit all packets of the large-quantity data as much as the data quantity to be transmitted. The large-quantity data is transmitted in units of the data quantity comparable to specified packets per transmission at a predetermined transmission interval such as 7.5 μsec. A plurality of transmissions is repeated to complete the entire data transmission. This type of data communication is available only when the connection is established.

The advertise signal serves as a keyword used to establish a connection in bidirectional communication. A peripheral device transmits the advertise signal more than once at a short cycle and thereby requests a central device to establish a connection. According to the present embodiment, the tire-mounted device 1 is comparable to the peripheral device and the vehicle body system 2 is comparable to the central device. The tire-mounted device 1 transmits an advertise signal to establish a connection with the vehicle body system 2. Advertise signals are subject to limitations on frequencies or the number of transmissions according to specifications or regulations. For example, the advertise signal needs to satisfy a frequency band of 2.5 GHz when the BLT communication is used as bidirectional communication. The advertise signal is repeatedly transmitted at a short cycle and is only available for small-quantity data, not for large-quantity data.

The advertise signal cannot contain "road surface data containing the raw waveform data besides the feature quantity" as "large-quantity data" but can contain "road surface data containing the feature quantity" as "small-quantity data." The present embodiment transmits "road surface data containing the feature quantity" contained in the advertise signal. The present embodiment performs data communication after establishing a connection only when there is a need for "road surface data containing the raw waveform data besides the feature quantity" as detailed data.

The power supply portion 13 supplies the power to the tire-mounted device 1. Power supply to components included in the tire-mounted device 1 operates the components. The power supply portion 13 is configured as a battery such as a button cell. The tire-mounted device 1 is provided inside the tire 3, making the battery replacement complicated. Therefore, it is necessary to reduce power consumption. The power supply portion 13 can be also configured as a generating unit and a storage battery as well as the battery, for example. The power supply portion 13 including a generating unit alleviates the issue of the battery life compared to the use of a battery. However, the generating unit hardly generates large amounts of power. The issue of reducing the power consumption remains similar to the use of a battery.

The receiver 21, the brake ECU 22, and the notification device 23 configuring the vehicle body system 2 are driven when a start switch such as an ignition switch (not shown) is turned on.

As illustrated in FIG. 2, the receiver 21 includes the data communication portion 24 and the road surface evaluation portion 25.

The data communication portion 24 configures a second data communication portion. The data communication portion 24 receives the road surface data containing the feature quantity or the road surface data containing the raw waveform data besides the feature quantity transmitted from the data communication portion 12 of the tire-mounted device 1 and transmits these types of data to the road surface evaluation portion 25.

The road surface evaluation portion 25 is configured as a known microcomputer including a CPU, ROM, RAM, and I/O, for example. The road surface evaluation portion 25 performs various processes based on a program mainly stored in the ROM and evaluates road surface conditions. Specifically, the road surface evaluation portion 25 saves support vectors. The road surface evaluation portion 25 evaluates a road surface condition by comparing the road surface data transmitted from the waveform processing portion 11 with a support vector.

Support vectors are stored and saved based on road surface types. The support vector provides a feature quantity as a model and is acquired from the learning using a support vector machine, for example. A vehicle including the tire-mounted device 1 is experimentally run on various types of road surfaces to learn feature quantities extracted by the waveform processing portion 11 as many as a predetermined number of tire rotations. A specified number of typical feature quantities are extracted to provide a support vector. For example, experiments are conducted on various types of road surfaces to learn feature quantities corresponding to 1,000,000 rotations from which typical feature quantities corresponding to 100 rotations are extracted to provide a support vector.

The road surface evaluation portion 25 evaluates a road surface condition by comparing the feature quantity transmitted from the tire-mounted device 1 and received by the data communication portion 24 with the saved support vectors corresponding to the types of road surfaces. For example, the feature quantity contained in the presently received road surface data is compared with the support vectors corresponding to the types of road surfaces to find a road surface corresponding to the support vector most approximate to the feature quantity. That road surface is evaluated as a currently traveled road surface.

After evaluating the road surface condition, the road surface evaluation portion 25 transmits the evaluated road surface condition to the notification device 23. The notification device 23 notifies the road surface condition to a driver as needed. The driver can try to do the driving appropriate to the road surface condition, making it possible to avoid vehicle risks. For example, the notification device 23 may always display the evaluated road surface condition. Alternatively, the road surface condition may be displayed to warn the driver only when the evaluated road surface condition shows a wet road or a frozen road requiring particularly careful driving. The receiver 21 supplies the road surface condition to the brake ECU 22 or an ECU to perform the vehicle motion control. The vehicle motion control is performed based on the supplied road surface condition.

The brake ECU 22 configures a braking control unit that provides various barking controls. Specifically, the brake ECU 22 drives an actuator to control brake fluid pressures and thereby increases or decreases a wheel cylinder pressure to control the braking force. The brake ECU 22 can also control the braking force of each wheel independently. The brake ECU 22 provides the braking force control as the vehicle motion control based on the road surface condition supplied from the receiver 21. When the supplied road surface condition shows a frozen road, for example, the brake ECU 22 decreases a braking force to be generated correspondingly to the amount of brake operation done by the driver in comparison with a dry road surface. This makes it possible to inhibit a wheel slip and avoid vehicle risks.

For example, the notification device 23 is configured as a meter display instrument and notifies the driver of a road surface condition. The meter display instrument configuring the notification device 23 is provided in a place such as an instrument panel of the vehicle so that the driver can easily view the meter display instrument while driving the vehicle. When the road surface condition is supplied from the receiver 21, the meter display instrument can visually notify the driver of the road surface condition by recognizably displaying the road surface condition.

The notification device 23 can be also configured as a buzzer or an audio guidance device. In this case, the notification device 23 can audibly notify the driver of a road surface condition by using the buzzer sound or the audio guidance. The notification device 23 may be also configured as a head-up display as well as the meter display instrument described above available as display instruments that can display information as a visual notification.

The tire device 100 according to the present embodiment is configured as above. Components configuring the vehicle body system 2 are connected via an in-vehicle LAN (Local Area Network) based on the CAN (Controller Area Network) communication, for example. The components can mutually transmit information via the in-vehicle LAN.

The tire device 100 according to the present embodiment is configured as above. The description below explains details of the feature quantity extracted by the above-described waveform processing portion 11.

The feature quantity represents the feature of a vibration that is applied to the tire 3 and is acquired by the vibration sensor portion 10. The feature quantity is represented as a feature vector, for example.

Figure 4:
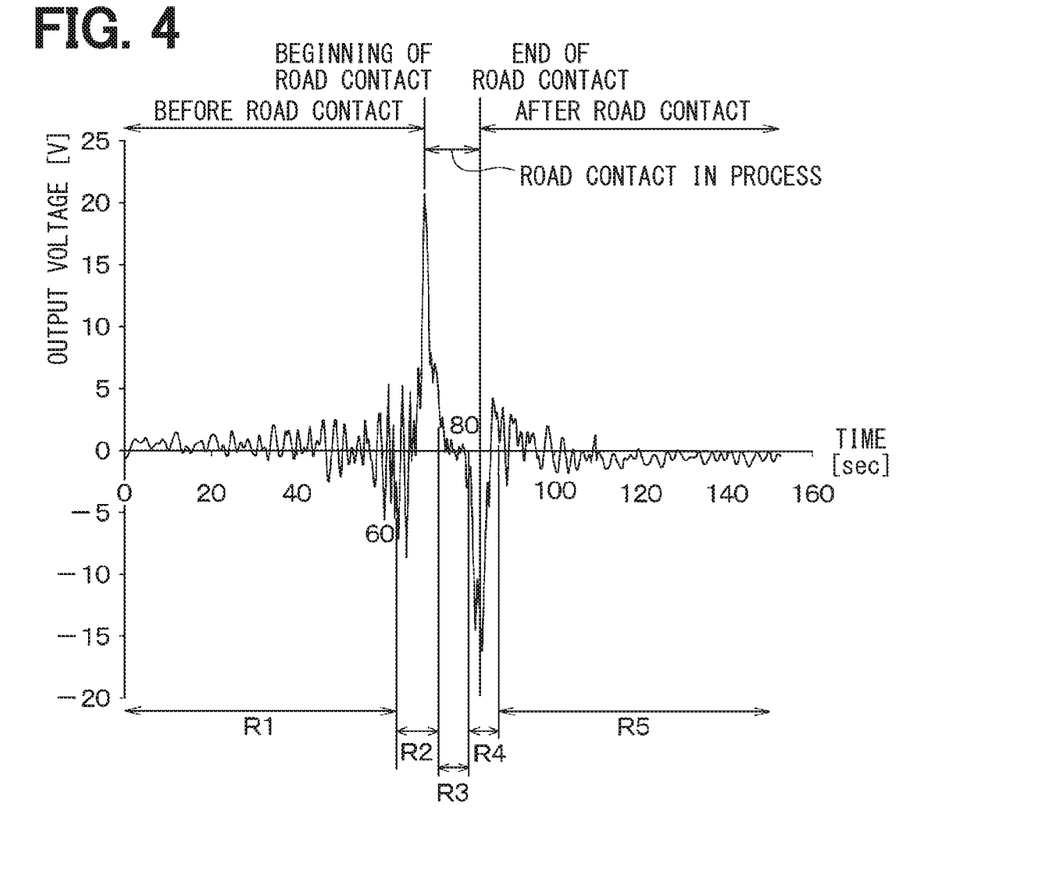
FIG. 4 is a diagram illustrating a voltage waveform output from a vibration sensor portion during tire rotation.

FIG. 4 illustrates a voltage waveform of a detection signal output from the vibration sensor portion 10 during tire rotation. As illustrated in FIG. 4, the tire 3 rotates and an output voltage from the vibration sensor portion 10 thereby reaches a local maximal value at a road contact start time to start a road contact with part of the tread 31 that corresponds to the position of mounting the vibration sensor portion 10. The local maximal value at this time is denoted as a first peak value to represent the local maximal value of the output voltage from the vibration sensor portion 10 at the road contact start time. As illustrated in FIG. 4, the tire 3 rotates and an output voltage from the vibration sensor portion 10 thereby reaches a local minimal value at a road contact end time to end a road contact with the part of the tread 31 that corresponds to the position of mounting the vibration sensor portion 10. The local minimal value at this time is denoted as a second peak value to represent the local minimal value of the output voltage from the vibration sensor portion 10 at the road contact end time.

The output voltage from the vibration sensor portion 10 reaches the peak values at the above-described timings for the following reason. The tire 3 rotates and causes a road contact with part of the tread 31 that corresponds to the position of mounting the vibration sensor portion 10. The tire 3 near the vibration sensor portion 10 is pressed to be deformed into a planar shape from an approximately cylindrical shape. Then, a shock is applied to change the output voltage from the vibration sensor portion 10 to the first peak value. The tire 3 further rotates and causes the contact area to be apart from the part of the tread 31 that corresponds to the position of mounting the vibration sensor portion 10. The tire 3 near the vibration sensor portion 10 is released from the pressed state and returns to the planar shape from the approximately cylindrical shape. When the shape of the tire 3 returns to the normal, a shock is applied to change the output voltage from the vibration sensor portion 10 to the second peak value. As above, the output voltage from the vibration sensor portion 10 reaches the first peak and the second peak at the road contact start time and the road contact end time, respectively. When the tire 3 is pressed, a shock is applied in a direction opposite to the direction of a shock applied when the pressed state is released. Therefore, the resulting output voltages are accordingly detected to be positive and negative.

In the description below, a "leading region" signifies an instant to make contact between the road surface and the part of the tread 31 that corresponds to the position of mounting the vibration sensor portion 10. A "trailing region" signifies an instant to cause that part to leave from the road surface. The "leading region" includes the timing to cause the first peak value. The "trailing region" includes the timing to cause the second peak value. A "pre-leading region" precedes the leading region. A "pre-trailing region" intermediates between the leading region and the trailing region and therefore maintains a road contact with the part of the tread 31 that corresponds to the position of mounting the vibration sensor portion 10. A "post-trailing region" follows the trailing region. It is possible to define the five regions divided to represent the period of maintaining a road contact with the part of the tread 31 corresponding to the position of mounting the vibration sensor portion 10 and immediate periods before and after that period. In FIG. 4, the detection signal is divided into regions R1 through R5 corresponding to "pre-leading region", "leading region", "pre-trailing region", "trailing region", and "post-trailing region" in order.

A road surface condition varies vibrations generated from the tire 3 in the divided regions and changes a detection signal from the vibration sensor portion 10. Frequency analysis is applied to the detection signal from the vibration sensor portion 10 in each region to detect a road surface condition of the road surface traveled by the vehicle. For example, a shear force at the trailing edge decreases under a slippery road surface condition such as a compacted snow road. Therefore, small band frequency values are selected from the band frequency of 1 kHz to 4 kHz in trailing region R4 or post-trailing region R5. The road surface conditions vary the frequency components of the detection signal from the vibration sensor portion 10. It is possible to evaluate the road surface condition based on the frequency analysis on a detection signal.

Figure 5:
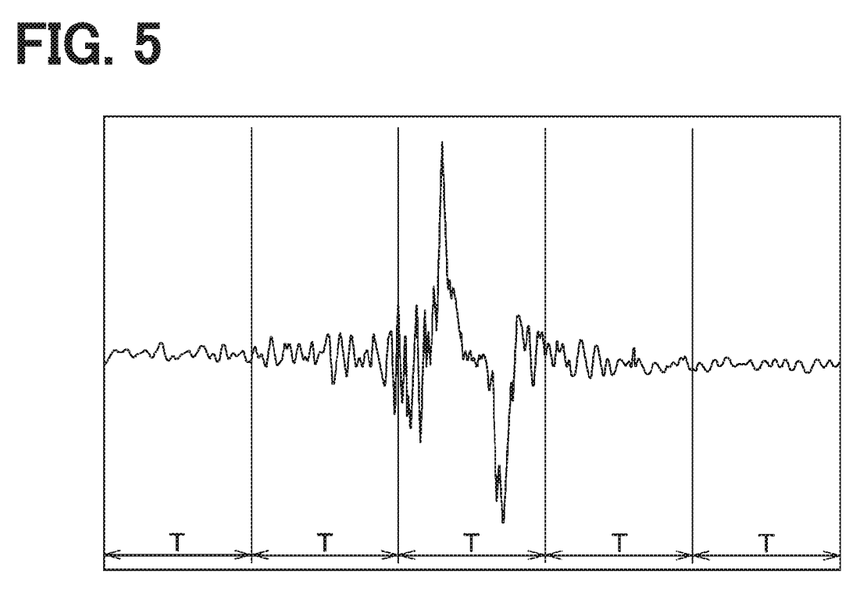
FIG. 5 illustrates a signal that is detected by the vibration sensor portion and is segmented into time windows each having predetermined duration T.

The detection signal from the vibration sensor portion 10 corresponds to one rotation of the tire 3 and forms a continuous time-based waveform. The waveform processing portion 11 divides the detection signal into a plurality of segments each corresponding to a time window of predetermined duration T as illustrated in FIG. 5. The frequency analysis is performed in each segment to extract a feature quantity. Specifically, the frequency analysis is performed in each segment to find a power spectrum value in each frequency band, namely, a vibration level in the specific frequency band. The power spectrum value is assumed to be a feature quantity.

The number of segments divided by time windows of duration T varies with vehicle speed, or more specifically, a rotation speed of the tire 3. In the description below, the number of segments for one rotation of the tire is depicted as n (natural number).

For example, detection signals corresponding to the segments pass through a plurality of filters having specific frequency bands such as five bandpass filters corresponding to 0 through 1 kHz, 1 through 2 kHz, 2 through 3 kHz, 3 through 4 kHz, and 4 through 5 kHz. The resulting power spectrum value is assumed to be a feature quantity. The feature quantity is called a feature vector. Suppose feature vector Xi exists in a given segment i, where i is a natural number satisfying 1≤i≤n, and a power spectrum value of each specific frequency band is denoted as $a_{ik}$. Then, feature vector Xi is represented as a matrix containing the power spectrum values as elements. See the equation below.

$$X_i = \begin{bmatrix} a_{i1} \\ a_{i2} \\ a_{i3} \\ a_{i4} \\ a_{i5} \end{bmatrix} \quad \text{[Math 1]}$$

Element k in power spectrum value $a_{ik}$ denotes the number of specific frequency bands, namely, the number of bandpass filters. Element k takes 1 to 5 when the band ranging from 0 to 5 kHz is divided into five. Determinant X totals feature vectors X1 through Xn for all segments 1 through n and is expressed by the following equation.

$$X = \begin{pmatrix} a_{11} & a_{21} & \ldots & a_{n1} \\ a_{12} & a_{22} & \ldots & a_{n2} \\ a_{13} & a_{23} & \ldots & a_{n3} \\ a_{14} & a_{24} & \ldots & a_{n4} \\ a_{15} & a_{25} & \ldots & a_{n5} \end{pmatrix} \quad \text{[Math 2]}$$

Determinant X expresses the feature quantity corresponding to one tire rotation. The waveform processing portion 11 extracts the feature quantity expressed by determinant X by performing the frequency analysis on detection signals from the vibration sensor portion 10.

Figure 6:
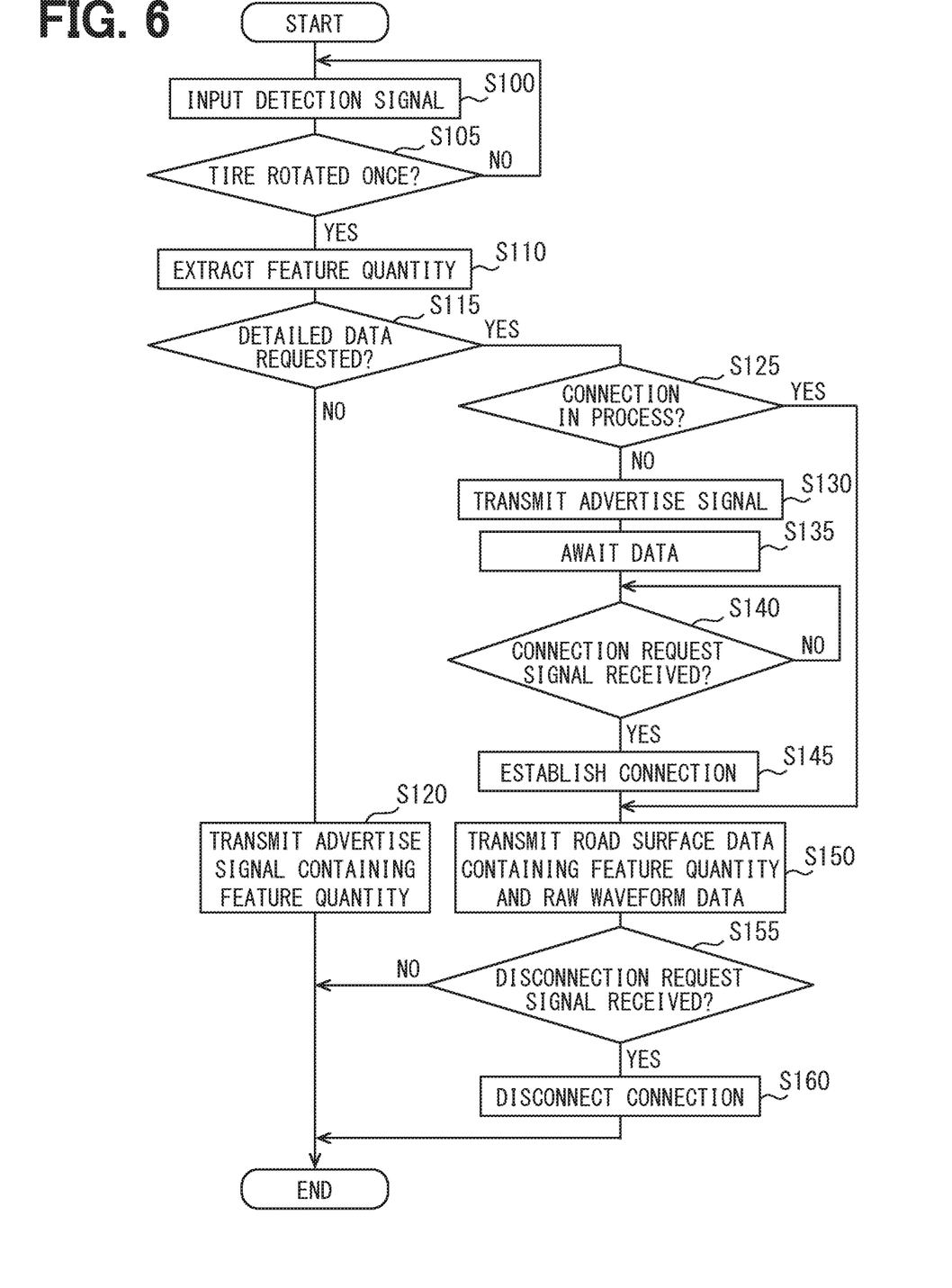
FIG. 6 is a flowchart illustrating a tire-side process performed by a waveform processing portion of the tire-mounted device.
Figure 7:
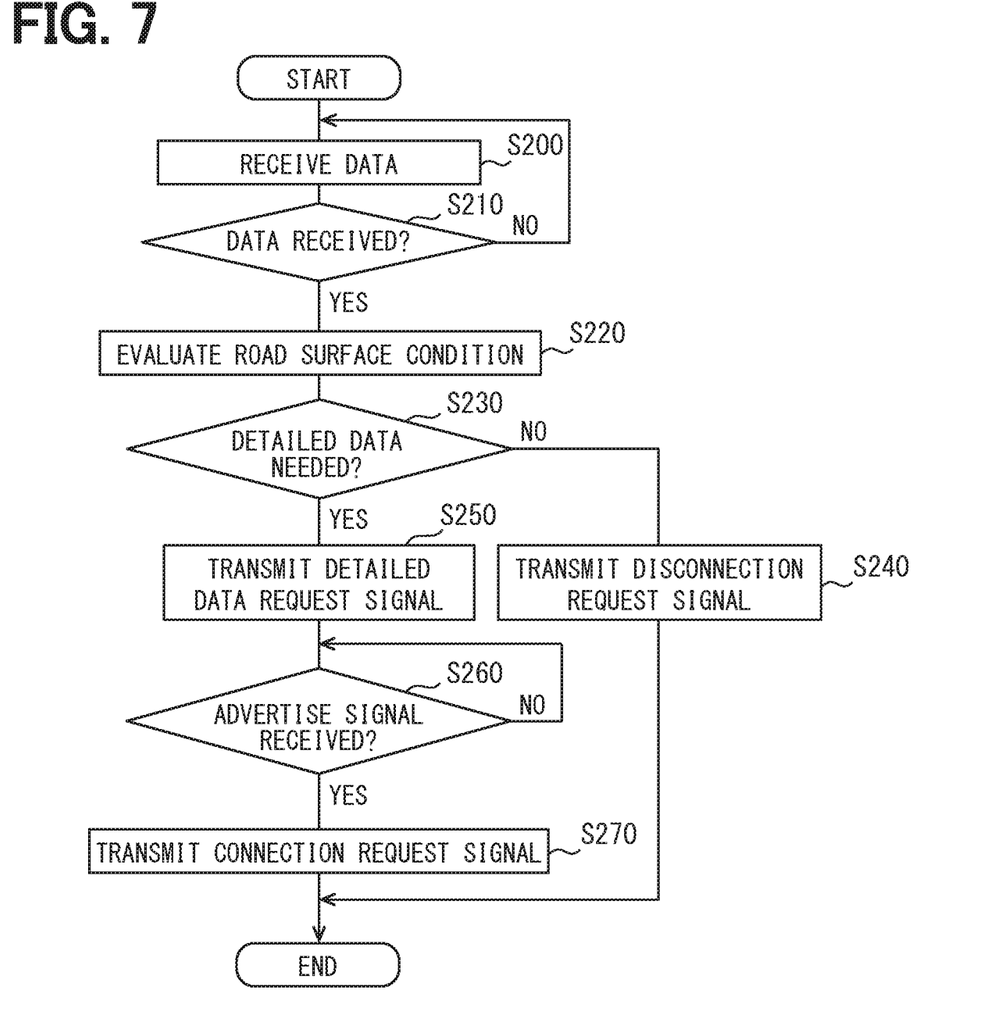
FIG. 7 is a flowchart illustrating a road surface condition evaluation process performed by a road surface evaluation portion of the vehicle body system.

With reference to FIGS. 6 and 7, the description below explains the operations of the tire device 100 according to the present embodiment. The following example explains a case where detailed data is requested to evaluate road surface conditions although road surface conditions were previously evaluated without detailed data, namely, raw waveform data.

The tire-mounted device 1 for each wheel allows the waveform processing portion 11 to perform a tire-side process as illustrated in FIG. 6. This process is performed at a predetermined control cycle.

In step S100, the process inputs a detection signal from the vibration sensor portion 10. This process continues until the tire 3 makes one rotation in step S105. The process proceeds to S110 after inputting the detection signal corresponding to one tire rotation. The process extracts a feature quantity from the time-based waveform of the input detection signal that corresponds to one tire rotation and is acquired from the vibration sensor portion 10.

One rotation of the tire 3 is evaluated based on the time-based waveform of the detection signal from the vibration sensor portion 10. The detection signal forms the time-based waveform illustrated in FIG. 4, making it possible to confirm the first and second peak values of the detection signal and recognize one rotation of the tire 3.

The road surface condition is identified as a change in the time-based waveform of the detection signal particularly during the period before and after "leading region", "pre-trailing region", and "trailing region," inclusive. It just needs to be supplied with data in this period, not always requiring all data for detection signals from the vibration sensor portion 10 during one tire rotation. For example, the "pre-leading region" or the "post-trailing region" just requires data approximate to the "leading region" or the "trailing region." No detection signal may be input in terms of a region that causes the vibration level of a detection signal from the vibration sensor portion 10 to be smaller than a predetermined threshold value. Such a region is assumed to correspond to the period that is hardly subject to an effect of the road surface condition in the "pre-leading region" or the "post-trailing region."

The above-described technique is used to extract the feature quantity in step S110.

The process proceeds to S115 to determine whether detailed data is requested. This determination is affirmed when the vehicle body system 2 transmits a detailed data request signal in step S250 in FIG. 7 to be described. At this stage, no detailed data request signal is transmitted. The process proceeds to S120 and supplies the road surface data to the data communication portion 12. The road surface data contains the feature quantity extracted at the present control cycle. The data communication portion 12 transmits the advertise signal containing the road surface data that contains the feature quantity while no connection is established. In this case, the advertise signal is comparable to a first advertise signal.

The receiver 21 allows the road surface evaluation portion 25 to perform a road surface condition evaluation process illustrated in FIG. 7. This process is performed at a predetermined control cycle.

In step S200, the process performs a data reception process. This process is performed when the data communication portion 24 receives road surface data and the road surface evaluation portion 25 incorporates the road surface data. When the data communication portion 24 receives no data, the road surface evaluation portion 25 incorporates no road surface condition and the process terminates.

The process then proceeds to S210 and determines whether data is received. If data is received, the process proceeds to S220. If no data is received, the process in steps S200 and S210 is repeated until data is received.

The process proceeds to S220 and evaluates the road surface condition. The process evaluates the road surface condition by comparing the feature quantity contained in the received road surface data with support vectors corresponding to the road surface types saved in the road surface evaluation portion 25. For example, the process finds a similarity ratio between the feature quantity and all support vectors corresponding to the road surface types and evaluates the road surface corresponding to the support vector indicating the highest similarity ratio as a currently traveled road surface.

For example, the following technique can be used to calculate a similarity ratio between the feature quantity and all support vectors corresponding to the road surface types.

In terms of determinant X expressing the feature quantity as above, a determinant for the feature quantity is denoted as $X(r)$. A determinant for the support vector is denoted as $X(s)$. Elements of the determinants comprised of power spectrum values $a_{ik}$ are denoted as $a(r)_{ik}$ and $a(s)_{ik}$. Then, determinant $X(r)$ for the feature quantity and determinant $X(s)$ for the support vector are expressed as follows.

$$X(r) = \begin{pmatrix} a(r)_{11} & a(r)_{21} & \cdots & a(r)_{n1} \\ a(r)_{12} & a(r)_{22} & \cdots & a(r)_{n1} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Math 3]}$$

$$X(s) = \begin{pmatrix} a(s)_{11} & a(s)_{21} & \cdots & a(s)_{n2} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{pmatrix} \quad \text{[Math 4]}$$

The similarity ratio indicates the degree of similarity between the feature quantity and the support vector expressed by the two determinants. An increase in the similarity ratio increases the similarity. According to the present embodiment, the road surface evaluation portion 25 uses the kernel method to find a similarity ratio and evaluates a road surface condition based on the similarity ratio. Specifically, the road surface evaluation portion 25 calculates an inner product between determinant $X(r)$ for the feature quantity and determinant $X(s)$ for the support vector, namely, a distance between coordinates indicated by feature vectors Xi for the segments each divided by the time window corresponding to predetermined duration T in a feature space. The distance between the coordinates is used as a similarity ratio.

Figure 8:
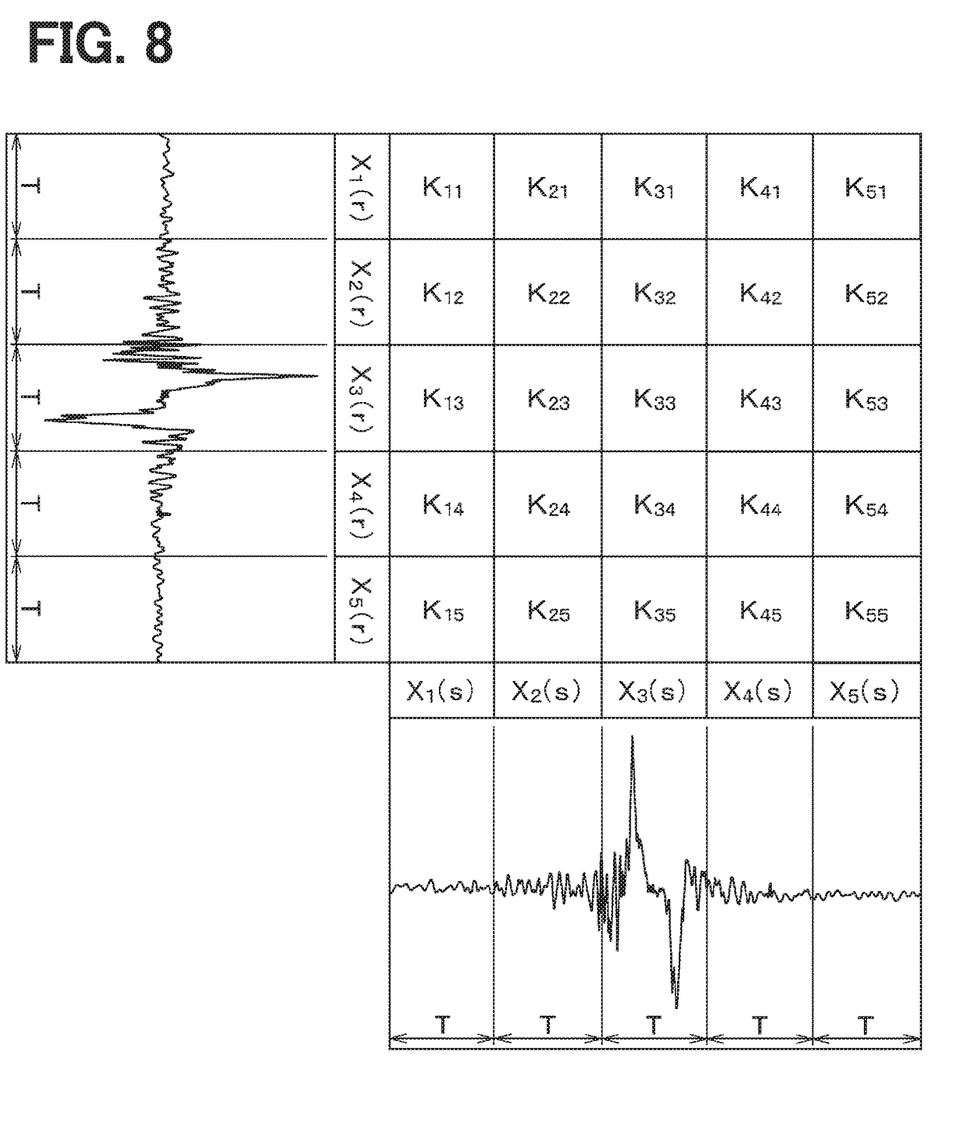
FIG. 8 is a diagram illustrating the relationship among determinants Xi (r) and Xi (s) and distance $_{yz}$ in each segment resulting from dividing a time-based waveform for the current rotation of a tire and a time-based waveform for one rotation before the current one by a time window corresponding to predetermined duration T.

For example, FIG. 8 illustrates time-based waveforms of a detection signal from the vibration sensor portion 10 including a time-based waveform during the present rotation of the tire 3 and a time-based waveform for the support vector. These time-based waveforms are divided into segments based on the time window having predetermined duration T. According to the illustrated example, each time-based waveform is divided into five segments under the condition of n=5 and 1≤i≤5. As illustrated in the drawing, $X_i(r)$ denotes feature vector $X_i$ for each segment during the present rotation of the tire 3 and $X_i(s)$ denotes the feature vector for each segment of the support vector. Distance $K_{yz}$ between coordinates indicated by feature vector $X_i$ in each segment is represented as a cell corresponding to an intersection between a horizontal series of cells containing feature vector $X_i(r)$ in each segment during the present rotation of the tire 3 and a vertical segment of cells containing feature vector $X_i(s)$ in each segment of the support vector. In distance $K_{yz}$, y corresponds to i in $X_i(s)$ and z corresponds to i in $X_i(r)$. Practically, vehicle speeds cause a different number of segments for the present rotation of the tire 3 and the support vector. The example here assumes the same number of segments.

The present embodiment divides a detection signal into five specific frequency bands to acquire a feature vector. Feature vector Xi for each segment is represented in a 6-dimensional space including a time axis. A distance between coordinates indicated by feature vector Xi corresponding to the segments is equal to a distance between coordinates in the 6-dimensional space. An increase in the similarity between the feature quantity and the support vector decreases a distance between coordinates indicated by feature vectors corresponding to the segments. A decrease in the similarity increases the distance. Therefore, a decrease in the distance increases the similarity ratio. An increase in the distance decreases the similarity ratio.

For example, suppose there are time-shared segments 1 through n. The following equation expresses distance $K_{yz}$ between coordinates indicated by the feature vectors for segment 1.

$$K_{yz} = \sqrt{\{a(r)_{11} - a(s)_{11}\}^2 + \{a(r)_{12} - a(s)_{12}\}^2 + \ldots \{a(r)_{15} - a(s)_{15}\}^2} \quad [\text{Math 5}]$$

There has been settled distance $K_{yz}$ between coordinates indicated by the feature vectors for the time-shared segments and distance $K_{yz}$ is found for all the segments. Distances $K_{yz}$ for all the segments are totaled to $K_{total}$. Total $K_{total}$ is used as a value corresponding to the similarity ratio. Total $K_{total}$ is compared with predetermined threshold value Th. The similarity ratio is low when total $K_{total}$ is larger than threshold value Th. The similarity ratio is high when total $K_{total}$ is smaller than threshold value Th. The similarity ratio is calculated for all the support vectors. The road surface type corresponding to the support vector indicating the highest similarity ratio is evaluated as the presently traveled road surface condition. The road surface condition can be evaluated based on the above-described technique.

In the above-described example, the value corresponding to the similarity ratio is represented by total $K_{total}$ of distances $K_{yz}$ between two coordinates indicated by the feature vectors for the segments. It is possible to use other parameters to represent the similarity ratio. For example, parameters to represent the similarity ratio include average distance $K_{ave}$ that is an average of distances $K_{yz}$ found by dividing total $K_{total}$ by the number of segments. As described in patent literature 1, various support vectors can be used to find a similarity ratio. The similarity ratio may be calculated by excluding feature vectors corresponding to low similarity ratios instead of using all the feature vectors.

There may be a case where the road surface condition cannot be evaluated appropriately. For example, high similarity ratios may be found between the support vectors for a plurality of road surfaces and there may be a plurality of candidates assumed to be similar. In this case, it is favorable to request detailed data to evaluate the road surface condition in more detail. For this purpose, in step S230, the process determines whether the detailed data is needed.

The determination in step S230 is affirmed if the road surface condition is not evaluated appropriately in step S220. The determination in step S230 is negated if the road surface condition is evaluated appropriately. The above-described road surface condition evaluation is performed based on the feature quantity in the road surface data transmitted from the tire-mounted device 1 of each wheel. The process independently evaluates road surface conditions of the road surfaces traveled by the tire 3 equipped with the four tire-mounted devices 1. In this example, an inappropriate evaluation of the road surface condition signifies that the road surface condition cannot be evaluated based on the feature quantity in the road surface data transmitted from at least one of the four tire-mounted devices 1.

However, this is just an example. There may be other cases where the road surface condition is evaluated inappropriately. As another example, the road surface condition cannot be evaluated based on the feature quantity in the road surface data transmitted from all the four tire-mounted devices 1. As yet another example, the road surface condition cannot be evaluated based on the feature quantity in the road surface data transmitted from the tire-mounted devices 1 provided for both right or left wheels.

The process proceeds to S240 on the assumption that the road surface condition is evaluated appropriately without detailed data. The process in step S240 is performed when a connection is established as will be described later. If a connection is established, the process transmits a disconnection request signal and then terminates. If no connection is established, the process directly terminates.

The connection can be established as needed, reducing power consumption. A state of consistently establishing the connection enables consistent communication of detailed data. However, the power consumption increases and may shorten the battery life of the tire-mounted device 1 that is installed at a remote location. It is favorable to establish a connection as needed and disconnect the connection when unneeded. This makes it possible to reduce power consumption and extend battery life.

The road surface condition may be inappropriately evaluated in step S230. Then, the process proceeds to S250 and transmits a detailed data request signal. The detailed data request signal may be transmitted to all the tire-mounted devices 1. It just needs to transmit the detailed data request signal to at least the tire-mounted device 1 that fails in the appropriate evaluation of the road surface condition. The request signal is transmitted based on stored ID information about the tire-mounted device 1 that requests transmission of the detailed data. The information needs to be transmitted to only the necessary tire-mounted device 1, making it possible to reduce power consumption. The request signal can contain the ID information about each tire-mounted device 1 because the receiver 21 stores ID contained in data transmitted from the tire-mounted device 1 so that the vehicle body system 2 can recognize the ID.

Suppose the vehicle body system 2 transmits the detailed data request signal to the tire-mounted device 1. Then, the tire-side process in FIG. 6 affirms step S115. After the determination in step S115 is affirmed, the process proceeds to S125 and determines whether the waveform processing portion 11 is connected. No connection is established immediately after the detailed data request signal is received. Then, the process proceeds to S130. The process proceeds to S150 if the connection is established based on a process to be described later.

In step S130, the waveform processing portion 11 transmits an advertise signal to establish a connection. The advertise signal at this time is comparable to a second advertise signal. To establish a connection, the advertise signal just needs to be capable of requesting the vehicle body system 2 to transmit a connection request signal to be described. However, the advertise signal may contain the road surface data containing the feature quantity. The process proceeds to S135. the waveform processing portion 11 is ready for reception to be able to receive the connection request signal to be transmitted from the vehicle body system 2 later as will be described later.

In step S260 in FIG. 7, the road surface condition evaluation process determines whether an advertise signal is received. The process is repeated until an advertise signal is received. For example, scanning is performed at a predetermined scanning cycle to read data transmitted from the tire-mounted device 1 and determines whether an advertise signal is received, on the basis of the cycle. The determination in step S260 is affirmed if the tire-mounted device 1 transmits an advertise signal. Then, the process proceeds to S270 and transmits a connection request signal.

In FIG. 6, step S140 of the tire-side process is affirmed if a connection request signal is transmitted from the receiver 21. Then, the process proceeds to S145 and establishes a connection. A dedicated connection path is thereby established between each tire-mounted device 1 and the receiver 21, enabling communication of even a large amount of data. The process proceeds to S150 and transmits the road surface data containing the raw waveform data besides the feature quantity to the vehicle body system 2.

The receiver 21 is supplied with the road surface data containing the raw waveform data besides the feature quantity and can evaluate the road surface condition based on more detailed data when the road surface condition evaluation process in steps S200 through S220 in FIG. 7 is performed again. A variety of known techniques can be used to evaluate road surface conditions using the raw waveform data. For example, the receiver 21 can evaluate road surface conditions by newly extracting a feature quantity and calculating a similarity ratio to the support vector as above or based on the magnitude of an integrated value of output voltages corresponding to a predetermined frequency band in the raw waveform data.

If the road surface condition is evaluated appropriately in step S220, the road surface evaluation portion 25 proceeds to S240 and transmits a disconnection request signal. Based on this, step S155 of the tire-side process in FIG. 6 determines that the disconnection request signal is received. The waveform processing portion 11 proceeds to S160, disconnects the connection, and terminates the process. The connection is maintained until the disconnection request signal is received. Transmission of the feature quantity and the road surface data containing the raw waveform data continues.

As above, the tire device 100 according to the present embodiment can evaluate road surface conditions of road surfaces traveled by the vehicle. When evaluating a road surface condition, the tire-mounted device 1 transmits the road surface data by allowing an advertise signal to include the road surface data containing the feature quantity as small-quantity data and evaluates the road surface based on the feature quantity. This makes it possible to perform the road surface evaluation without establishing a connection and reduce the power consumption without needing to establish a connection each time the road surface data is transmitted.

The tire device 100 can include the road surface condition assessing device capable of appropriately evaluating road surface conditions while reducing the power consumption.

The road surface condition may not be evaluated appropriately based on the feature quantity contained in the road surface data transmitted along with the advertise signal, inclusive. In this case, the vehicle body system 2 transmits the detailed data request signal to the tire-mounted device 1. This makes a connection between the tire-mounted device 1 and the vehicle body system 2. The tire-mounted device 1 transmits the road surface data containing the raw waveform data as large-quantity data to the vehicle body system 2. The road surface condition is evaluated based on the raw waveform data. Therefore, the road surface condition can be evaluated appropriately based on the raw waveform data even if the road surface condition is not evaluated appropriately based on the feature quantity transmitted with the advertise signal.

Second Embodiment

The second embodiment will be described. The present embodiment differs from the first embodiment in the technique of establishing a connection and is similar to the first embodiment in the other configurations. The description below explains only differences from the first embodiment.

According to the first embodiment, the vehicle body system 2 requests detailed data as needed. Then, the tire-mounted device 1 transmits an advertise signal. The vehicle body system 2 receives the advertise signal and transmits a connection request signal. Namely, the vehicle body system 2 requests the tire-mounted device 1 to establish a connection.

Figure 9:
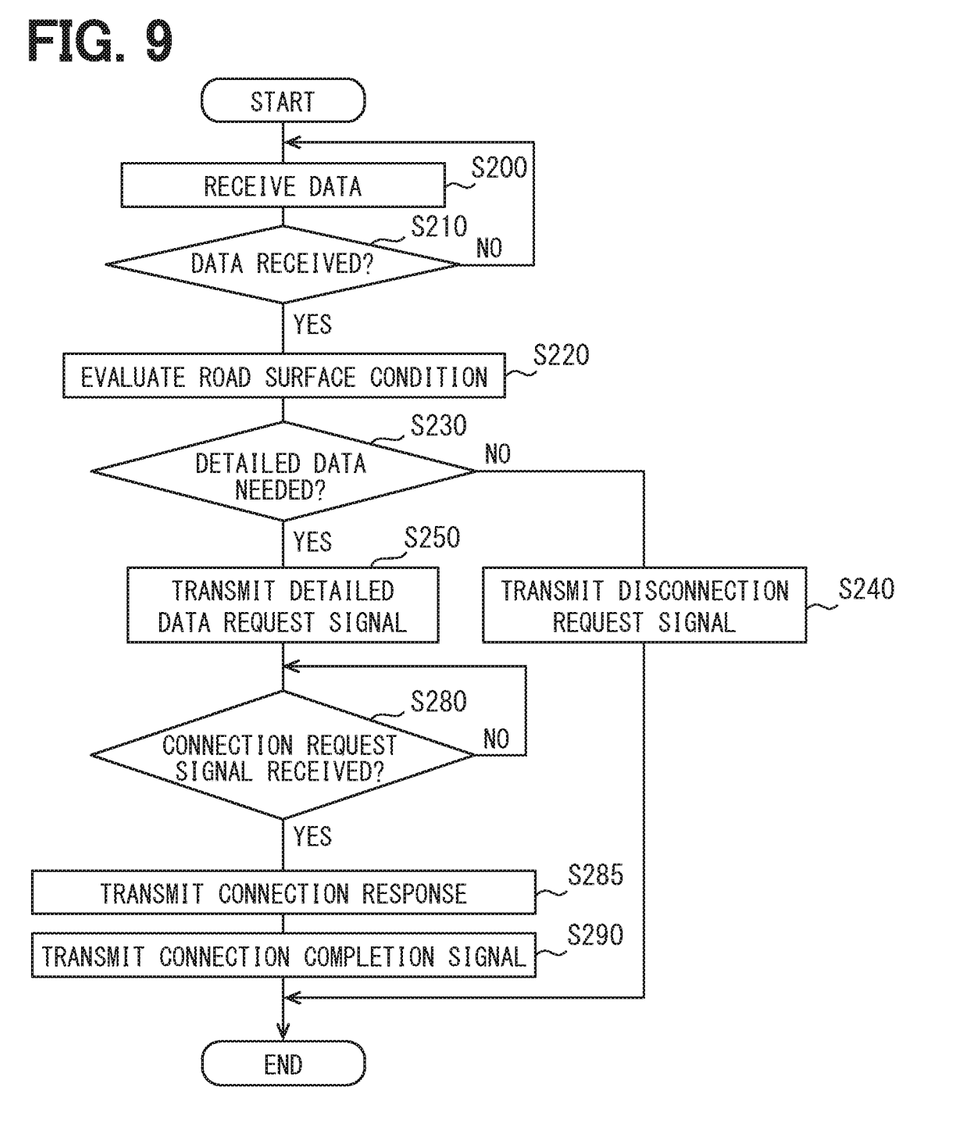
FIG. 9 is a flowchart illustrating a road surface condition evaluation process performed by the road surface evaluation portion of the tire-mounted device.

Meanwhile, the tire-mounted device 1 may request the vehicle body system 2 to establish a connection. Specifically, the road surface evaluation portion 25 performs a road surface condition evaluation process illustrated in FIG. 9. The process in FIG. 9 replaces the process in FIG. 7 according to the first embodiment. The present embodiment performs almost the same process as illustrated in FIG. 6 according to the first embodiment. The process in FIG. 9 is partially common to the process in FIG. 7 The common part is omitted from the description.

According to the present embodiment similar to the first embodiment, the tire-mounted device 1 performs the process illustrated in FIG. 6. The road surface evaluation portion 25 performs the process illustrated in FIG. 9. When the detailed data request signal is transmitted in step S250 of FIG. 9, the tire-mounted device 1 transmits an advertise signal comparable to the second advertise signal as described in step S130 of FIG. 6. at this time, the advertise signal contains a connection request signal that requests the connection establishment. the vehicle body system 2 receives the advertise signal containing the connection request signal in step S280 of FIG. 9. Then, the process in steps S285 and S290 of FIG. 9 is performed instead of transmitting the connection request signal in step S270 of FIG. 7. In step S285, the process transmits a connection response signal to establish a connection. In step S290, the process transmits a connection completion signal to the tire-mounted device 1. The connection completion signal indicates the completion of the connection establishment. The tire-mounted device 1 can thereby reliably confirm that the connection is established. When the connection is established, the tire-mounted device 1 and the vehicle body system 2 transition to the connected state and can identify that they are connected. Steps S140 and S145 of the process in FIG. 6 are eliminated when the tire-mounted device 1 requests the vehicle body system 2 to establish a connection.

During the reception wait state in step S135 of FIG. 6, the reception of the connection completion signal performs the process in step S150 without performing the process in step S145. The process transmits the road surface data containing the feature quantity and the raw waveform data.

As above, the tire-mounted device 1 can request the vehicle body system 2 to establish a connection. The second embodiment can also provide an effect similar to that of the first embodiment.

Other Embodiments

The present disclosure has been described regarding the above-described embodiments but is not limited to the embodiments and includes variously modified examples and modifications within applicable scopes. Besides, the category or the scope of the idea of the present disclosure covers various combinations or forms and the other combinations or forms including only one element or more or less in the former.

(1) For example, the above-described embodiments configure the vibration sensor portion 10 to use the acceleration sensor. The vibration sensor portion 10 may also use other elements such as a piezoelectric element capable of detecting vibrations.

(2) The above-described embodiments use data containing the feature quantity as the road surface data indicating the road surface condition appearing in the detection signal from the vibration sensor portion 10. However, other data may be used as the road surface data. For example, the road surface data may use integrated value data for vibration waveforms corresponding to five regions R1 through R5 contained in the vibration data for one rotation of the tire 3. The feature quantity or the integrated value data provides a value corresponding to the road surface condition and is comparable to a waveform processing value representing the result of waveform processing applied to a vibration waveform. The waveform processing value is small-quantity data and can be transmitted to the vehicle body system 2 along with the advertise signal inclusive.

(3) According to the above-described embodiments, the road surface evaluation portion 25 of the receiver 21 included in the vehicle body system 2 finds a similarity ratio between the feature quantity and the support vector to evaluate the road surface condition. The receiver 21 transmits directive signals such as the detailed data request signal, the connection request signal, and the disconnection request signal.

Besides, any part of the vehicle body system 2 such as the brake ECU 22 or other ECUs may find similarity ratios, evaluate road surface conditions, or transmit directive signals.

(4) The tire-mounted device 1 may include a pressure sensor to detect the tire inflation pressure or a temperature sensor to detect the temperature inside the tire. Data such as the tire inflation pressure or the temperature inside the tire may be assumed to be data concerning the tire inflation pressure and can be transmitted to the vehicle body system 2. The data concerning the tire inflation pressure is small-quantity data and can be contained in the advertise signal to be transmitted along with the waveform processing value such as the feature quantity. There is no need to establish a connection, reducing the power consumption for the tire-mounted device 1.

(5) According to the second embodiment, the tire-mounted device 1 transmits the advertise signal containing a connection request signal when the vehicle body system 2 requests detailed data. Besides, when the data volume exceeds a predetermined volume, for example, the tire-mounted device 1 may primarily transmit the advertise signal containing a connection request signal to establish a connection with the vehicle body system 2.

According to the above-described embodiments, the tire-mounted device 1 is provided for each of a plurality of tires 3. Besides, the tire-mounted device 1 may be provided for at least one tire.

What is claimed is:

1. A road surface condition assessing device comprising:
a tire-mounted device that is arranged in a tire and transmits a road surface data relating to a road surface condition; and
a vehicle body system that is arranged in a vehicle body and receives the road surface data to evaluate the road surface condition, wherein:
the tire-mounted device communicates with the vehicle body system bi-directionally;
the tire-mounted device includes:
 a vibration detector that outputs a detection signal corresponding to a magnitude of a vibration applied to a tire;
 a waveform processor that generates the road surface data based on the detection signal; and
 a first data communication unit that performs data communication with the vehicle body system;
the vehicle body system includes:
 a second data communication unit that performs the data communication with the tire-mounted device; and
 a road surface evaluation unit that evaluates the road surface condition based on the road surface data received by the second data communication unit;
the tire-mounted device transmits an advertise signal including the road surface data;
the road surface data indicates a result of a waveform process obtained by processing the detection signal with the waveform processor and includes a waveform processing value corresponding to the road surface condition;
the vehicle body system evaluates the road surface condition based on the waveform processing value in the advertise signal;
the vehicle body system transmits a request signal for requesting the tire-mounted device to transmit a detailed data when the vehicle body system cannot evaluate the road surface condition based on the waveform processing value in the advertise signal;
when receiving the request signal for requesting the detailed data, the tire-mounted device establishes a connection with the vehicle body system and transmits a raw waveform data in the detection signal as the road surface data after establishing the connection;
the vehicle body system transmits a request signal for requesting the tire-mounted device to transmit a detailed data when the vehicle body system cannot evaluate the road surface condition based on the waveform processing value in the advertise signal; and
when receiving the request signal for requesting the detailed data, the tire-mounted device establishes a connection with the vehicle body system and transmits a raw waveform data in the detection signal as the road surface data after establishing the connection.

2. The road surface condition assessing device according to claim 1, wherein:
the waveform processor extracts a feature amount, indicating a feature of the vibration applied to the tire, as the waveform processing value from the detection signal and generates the road surface data including the feature amount.

3. A road surface condition assessing device comprising:
a tire-mounted device that is arranged in a tire and transmits a road surface data relating to a road surface condition; and
a vehicle body system that is arranged in a vehicle body and receives the road surface data to evaluate the road surface condition, wherein:
the tire-mounted device communicates with the vehicle body system bi-directionally;
the tire-mounted device includes:
  a vibration detector that outputs a detection signal corresponding to a magnitude of a vibration applied to a tire;
  a waveform processor that generates the road surface data based on the detection signal; and
  a first data communication unit that performs data communication with the vehicle body system;
the vehicle body system includes:
  a second data communication unit that performs the data communication with the tire-mounted device; and
  a road surface evaluation unit that evaluates the road surface condition based on the road surface data received by the second data communication unit;
the tire-mounted device transmits an advertise signal including the road surface data;
the road surface data indicates a result of a waveform process obtained by processing the detection signal with the waveform processor and includes a waveform processing value corresponding to the road surface condition;
the vehicle body system evaluates the road surface condition based on the waveform processing value in the advertise signal;
the vehicle body system transmits a request signal for requesting the tire-mounted device to transmit a detailed data when the vehicle body system cannot evaluate the road surface condition based on the waveform processing value in the advertise signal;
when receiving the request signal for requesting the detailed data, the tire-mounted device establishes a connection with the vehicle body system and transmits a raw waveform data in the detection signal as the road surface data after establishing the connection;
the advertise signal is defined as a first advertise signal;
when the vehicle body system cannot evaluate the road surface condition based on the waveform processing value in the advertise signal, the vehicle body system transmits a request signal for requesting the tire-mounted device to transmit a detailed data, and transmits a connection request signal for requesting a connection to the tire-mounted device after receiving a second advertise signal from the tire-mounted device;
the tire-mounted device receives the request signal for requesting the detailed data, transmits the second advertise signal, and awaits the connection request signal; and
when receiving the connection request signal, the tire-mounted device establishes the connection with the vehicle body system and transmits a raw waveform data in the detection signal as the road surface data after establishing the connection.

4. The road surface condition assessing device according to claim 3, wherein:
the waveform processor extracts a feature amount, indicating a feature of the vibration applied to the tire, as the waveform processing value from the detection signal and generates the road surface data including the feature amount.

5. A road surface condition assessing device comprising:
a tire-mounted device that is arranged in a tire and transmits a road surface data relating to a road surface condition; and
a vehicle body system that is arranged in a vehicle body and receives the road surface data to evaluate the road surface condition, wherein:
the tire-mounted device communicates with the vehicle body system bi-directionally;
the tire-mounted device includes:
  a vibration detector that outputs a detection signal corresponding to a magnitude of a vibration applied to a tire;
  a waveform processor that generates the road surface data based on the detection signal; and
  a first data communication unit that performs data communication with the vehicle body system;
the vehicle body system includes:
  a second data communication unit that performs the data communication with the tire-mounted device; and
  a road surface evaluation unit that evaluates the road surface condition based on the road surface data received by the second data communication unit;
the tire-mounted device transmits an advertise signal including the road surface data;
the road surface data indicates a result of a waveform process obtained by processing the detection signal with the waveform processor and includes a waveform processing value corresponding to the road surface condition;
the vehicle body system evaluates the road surface condition based on the waveform processing value in the advertise signal;
the vehicle body system transmits a request signal for requesting the tire-mounted device to transmit a detailed data when the vehicle body system cannot evaluate the road surface condition based on the waveform processing value in the advertise signal;
when receiving the request signal for requesting the detailed data, the tire-mounted device establishes a connection with the vehicle body system and transmits a raw waveform data in the detection signal as the road surface data after establishing the connection;
the advertise signal is defined as a first advertise signal;
when the vehicle body system cannot evaluate the road surface condition based on the waveform processing value in the advertise signal, the vehicle body system transmits a request signal for requesting the tire-mounted device to transmit a detailed data, and establishes a connection to the tire-mounted device after receiving a second advertise signal including a connection request signal for requesting the connection from the tire-mounted device; and
when receiving the request signal for requesting the detailed data, the tire-mounted device transmits the second advertise signal and transmits a raw waveform data in the detection signal as the road surface data after establishing the connection.

6. The road surface condition assessing device according to claim 5, wherein:
the waveform processor extracts a feature amount, indicating a feature of the vibration applied to the tire, as the waveform processing value from the detection signal and generates the road surface data including the feature amount.

* * * * *